(12) United States Patent
Aikoh et al.

(10) Patent No.: US 8,279,721 B2
(45) Date of Patent: Oct. 2, 2012

(54) NEAR-FIELD RECORDING HEAD CAPABLE OF DIRECTLY FORMING LIGHT SOURCE IN SLIDER

(75) Inventors: Hideki Aikoh, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 297 days.

(21) Appl. No.: 12/294,310

(22) PCT Filed: Mar. 26, 2007

(86) PCT No.: PCT/JP2007/056222
§ 371 (c)(1),
(2), (4) Date: Sep. 24, 2008

(87) PCT Pub. No.: WO2007/111304
PCT Pub. Date: Oct. 4, 2007

(65) Prior Publication Data
US 2009/0161499 A1    Jun. 25, 2009

(30) Foreign Application Priority Data
Mar. 29, 2006  (JP) .................................. 2006-091185

(51) Int. Cl.
*G11B 11/00* (2006.01)
(52) U.S. Cl. .................................. 369/13.33; 369/13.13
(58) Field of Classification Search ............... 369/13.33, 369/13.13, 13.32, 13.17, 112.09, 112.14, 369/112.21, 112.27; 385/129, 31, 88–94; 250/201.3
See application file for complete search history.

(56) References Cited

U.S. PATENT DOCUMENTS

| | | | |
|---|---|---|---|
| 6,542,455 B1 * | 4/2003 | Kuwahara et al. | 369/126 |
| 6,563,782 B1 * | 5/2003 | Oumi et al. | 369/126 |
| 6,649,894 B2 * | 11/2003 | Matsumoto et al. | 250/201.3 |
| 6,687,196 B1 * | 2/2004 | Ueyanagi | 369/13.33 |
| 6,768,556 B1 * | 7/2004 | Matsumoto et al. | 356/601 |
| 6,795,380 B2 * | 9/2004 | Akiyama et al. | 369/13.33 |
| 6,949,732 B2 * | 9/2005 | Kiguchi et al. | 250/216 |
| 6,992,968 B2 * | 1/2006 | Ueyanagi | 369/13.33 |
| 7,054,234 B2 * | 5/2006 | Saga et al. | 369/13.33 |
| 7,133,230 B2 | 11/2006 | Saga et al. | |
| 2002/0018312 A1 * | 2/2002 | Hamamoto et al. | 360/59 |
| 2004/0081031 A1 * | 4/2004 | Saga et al. | 369/13.33 |
| 2004/0085862 A1 * | 5/2004 | Matsumoto et al. | 369/13.33 |
| 2005/0163962 A1 * | 7/2005 | Kawato et al. | 428/65.3 |
| 2005/0265139 A1 | 12/2005 | Gomez et al. | |

(Continued)

FOREIGN PATENT DOCUMENTS
EP        0 390 263        10/1990
(Continued)

OTHER PUBLICATIONS

Supplementary European Search Report issued Mar. 5, 2009 in the Application No. EP 07 73 9660.

(Continued)

*Primary Examiner* — Tan X Dinh
(74) *Attorney, Agent, or Firm* — Wenderoth, Lind & Ponack, L.L.P.

(57) ABSTRACT

A near-field optical head capable of being significantly miniaturized is constituted by a near-field optical probe slider formed by holding, on a slider, a semiconductor laser, a heat dissipation member, a prism for guiding light from the semiconductor laser to a scattering body and a photodetector element.

12 Claims, 15 Drawing Sheets

U.S. PATENT DOCUMENTS

| | | | |
|---|---|---|---|
| 2008/0080039 A1* | 4/2008 | Hongo et al. | 359/237 |
| 2008/0123219 A1 | 5/2008 | Gomez et al. | |
| 2008/0151431 A1* | 6/2008 | Tanaka et al. | 360/245.3 |
| 2008/0158709 A1* | 7/2008 | Tanaka et al. | 360/59 |
| 2008/0192376 A1* | 8/2008 | Tanaka et al. | 360/59 |
| 2010/0020431 A1* | 1/2010 | Shimazawa et al. | 360/59 |
| 2010/0118666 A1* | 5/2010 | Mihara | 369/13.33 |
| 2011/0026377 A1* | 2/2011 | Shimazawa et al. | 369/13.24 |

FOREIGN PATENT DOCUMENTS

| | | |
|---|---|---|
| EP | 1 148 370 | 10/2001 |
| JP | 10-255302 | 9/1998 |
| JP | 11-259894 | 9/1999 |
| JP | 2003-45004 | 2/2003 |
| JP | 2003-162840 | 6/2003 |
| JP | 2004-151046 | 5/2004 |
| JP | 2004-158067 | 6/2004 |
| JP | 2005-78689 | 3/2005 |
| JP | 2006-4577 | 1/2006 |
| JP | 2006-73123 | 3/2006 |
| RU | 2 068 201 | 10/1996 |

OTHER PUBLICATIONS

International Search Report issued May 1, 2007 in the International (PCT) Application No. PCT/JP2007/056222.

* cited by examiner

FIG.12A
FIG.12B
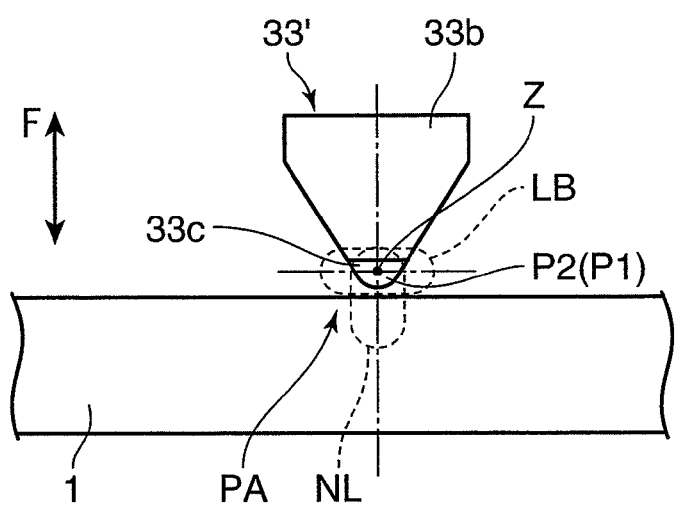
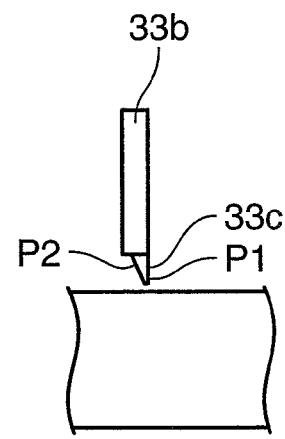

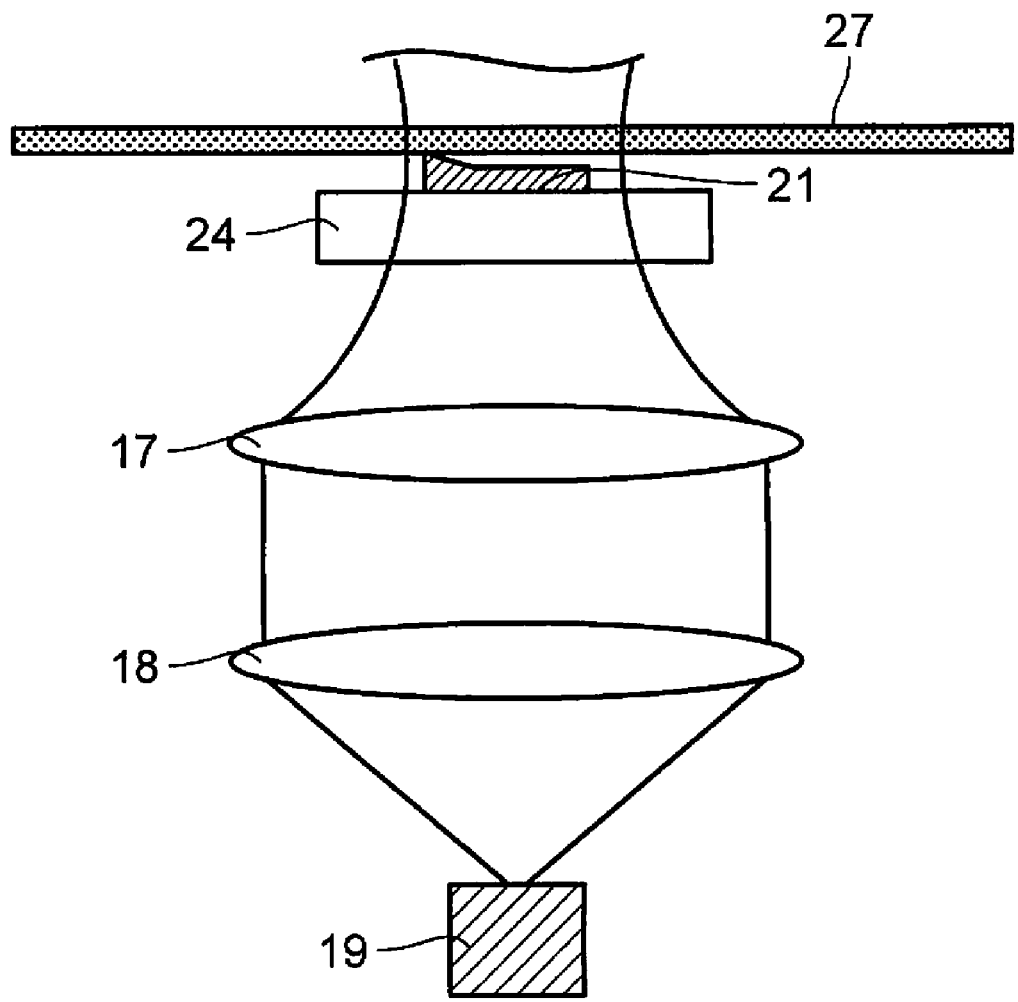

NEAR-FIELD RECORDING HEAD CAPABLE OF DIRECTLY FORMING LIGHT SOURCE IN SLIDER

BACKGROUND OF THE INVENTION

I. Technical Field

The present invention relates to a near-field optical head, and a near-field optical head device, a near-field optical information device and a near-field optical information system provided with the same, and relates to a device capable of recording or reproducing information at a higher density in or from a medium.

II. Description of the Related Art

In the field of optical information recording, notice has been taken of optical recording using a near field light. The prior art described in Japanese Patent Laid-Open Publication No. 2004-151046 presents a method for making a higher-density record with a near field light. FIGS. 13 to 15 show the configuration and main part of a near-field optical head device according to the prior art.

In FIGS. 13 and 14, a near-field optical probe slider 702 facing a disk 701 as a recording medium is provided with beam-condensing elements integrated therein and receives a parallel beam from an optical head 703. A carriage actuator 704 moves the optical head 703 in radial directions of the disk 701. A beam emitted from a semiconductor laser 708 as a light source passes through a collimating lens 709 and a beam-shaping prism 710 to become a circular parallel beam in the optical head 703 and is incident upon the near-field optical probe slider 702 through a beam splitter 712 and a mirror 714. The near-field optical probe slider 702 is subjected to an adjustment of the position thereof in the tracking directions by a piezo-electric element 711 and pressed onto the disk 701 by the force of a suspension 705 attached thereto.

FIG. 15 is a schematic side view of the near-field optical probe slider 702 provided with a scattering body 21 facing a disk 27 as a recording medium and a substrate 24 supporting this. The scattering body 21 and the substrate 24 are arranged on the near-field optical probe slider 702 in such a way that the distance between the scattering body 21 and the disk 27 is kept below tens nanometers. Light radiated from a light source 19 is incident upon the scattering body 21 through a collimating lens 18 and a beam-condensing element 17 to thereby generate intense near field light at the part of the scattering body 21 proximate to the disk 27. If the disk 27 is provided with a phase-change material, the near field light generated from the scattering body 21 changes the crystal phase into an amorphous phase to thereby form a record mark.

On the other hand, the reproduction is conducted, as shown in FIGS. 13 and 14, by detecting a variation in the intensity of light returning from the disk 701, more specifically, because the percentage of the near field light scattered by the disk 701 varies according to the presence of the record mark, by detecting a variation in the intensity of the scattered light. In practice, the light (signal light) from the disk 701 is split from the incident light by the beam splitter 712 and detected by a detector 717 after passing through a condensing lens 715. In the prior art, the polarization direction of the signal light from the disk 701 differs from the polarization direction of the incident light, thereby improving the contrast by setting the polarization direction of a polarizer 716 on the optical path perpendicular to the incident-light polarization direction.

However, in the near-field optical head device according to the prior art, the near-field optical probe slider 702 provided with the scattering body 21 generating a near field and the optical head 703 provided with a light source exist individually, thereby hindering miniaturizing the near-field optical head.

Specifically, in order to keep the distance between the scattering body 21 and the disk 27 shorter than several tens nanometers, the near-field optical probe slider 702 needs to be smaller and to be provided only with the scattering body 21 and the substrate 24 thereon, thereby meaning that the near-field optical probe slider 702 and the optical head 703 have to be separately formed by an individual member. Besides, in order to send a beam emitted from the semiconductor laser 708 as a light source to irradiate the whole main surface of the scattering body 21 parallel to the disk 701, the emitted beam from the semiconductor laser 708 needs to be incident from behind the scattering body 21, thereby requiring many optical devices such as the collimating lens 709, the beam-shaping prism 710, the beam splitter 712 and the mirror 714. This makes the optical head 703 and the whole near-field optical head larger.

SUMMARY OF THE INVENTION

It is an object of the present invention to provide a near-field optical head capable of recording or reproducing information at a higher density in or from a medium and being significantly miniaturized, and a near-field optical head device, a near-field optical information device and a near-field optical information system of small size provided with the near-field optical head.

A near-field optical head according to an aspect of the present invention includes: a light source; a scattering member having a substantially flat-plane shape; and a slider holding the light source and the scattering member, in which: the slider holds the scattering member in such a way that an end of the scattering member is proximate to a medium; the scattering member has a first plane located on the side of the light source and substantially perpendicular to the medium; light emitted from the light source irradiates the first plane substantially perpendicularly; and the end of the scattering member generates near field light and applies the near field light to the medium.

The near-field optical head can apply light emitted from the light source substantially perpendicularly to the first plane of the scattering member substantially perpendicular to the medium to thereby generate near field light from the end of the scattering member and apply it to the medium. This makes it possible to simplify the configuration of a recording optical system and significantly miniaturize the near-field optical head capable of recording or reproducing information at a higher density in or from a medium.

A near-field optical head device according to another aspect of the present invention includes: the near-field optical head; and a suspension structure supporting the slider to keep constant the distance between the end of the scattering member and the medium when recording information in the medium using the near field light by the scattering member.

The near-field optical head device includes the suspension structure supporting the slider to keep constant the distance between the end of the scattering member and the medium when recording information in the medium using the near field light by the scattering member. This makes it possible to miniaturize the near-field optical head device capable of stably recording or reproducing information at a higher density in or from a medium using the small near-field optical head.

A near-field optical information device according to still another aspect of the present invention includes: the near-field optical head device; and an electric circuit receiving a signal obtained from the near-field optical head device and controlling and driving the light source based on the signal.

The near-field optical information device can receive a signal obtained from the near-field optical head device and control and drive the light source based on the signal, thereby miniaturizing the near-field optical information device capable of stably recording or reproducing information at a higher density in or from a medium using the small near-field optical head device.

A near-field optical information system according to still another aspect of the present invention includes: the near-field optical information device; and an arithmetic unit making a predetermined calculation based on information recorded in or reproduced from the medium by the near-field optical information device.

The near-field optical information system can make a predetermined calculation based on information recorded in or reproduced from the medium by the near-field optical information device, thereby miniaturizing the near-field optical information system capable of making diverse calculations using information more densely and stably recorded or reproduced in or from a medium.

BRIEF DESCRIPTION OF THE DRAWINGS

FIGS. 12A and 12B are front and side views, respectively, showing another configuration of a scattering member according to the present invention.

FIG. 15 is a side view showing the main part of the near-field optical head device according to the prior art.

BEST MODE FOR IMPLEMENTING THE INVENTION

Each embodiment of the present invention will be below described with reference to the drawings.

(First Embodiment)

Figure 1:
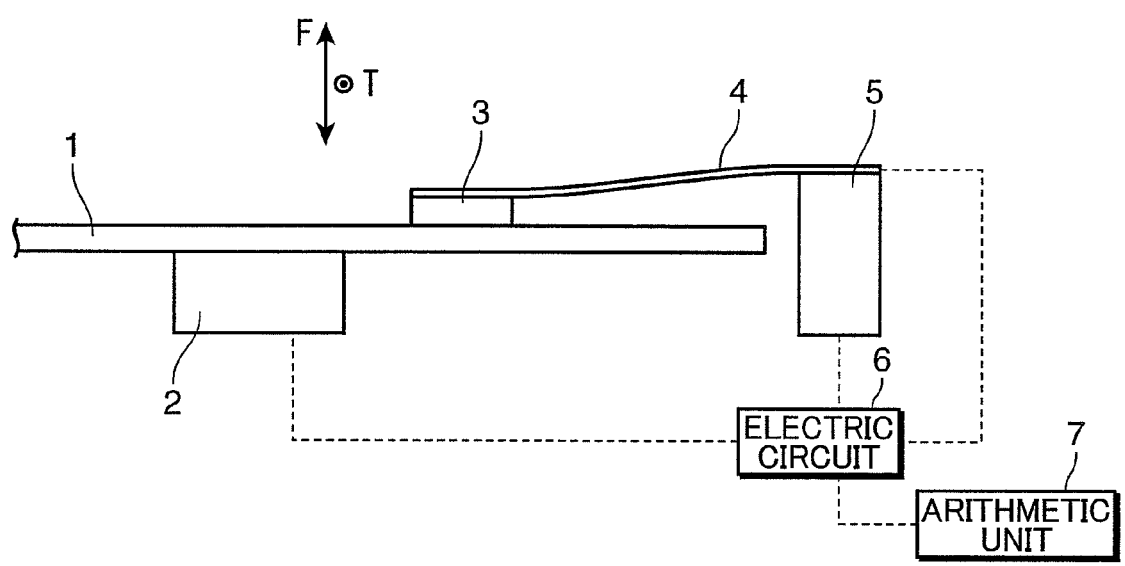
FIG. 1 is a schematic side view of a near-field optical information system according to a first embodiment of the present invention.

First, a configuration and an operation according to a first embodiment of the present invention will be described with reference to FIGS. 1 to 4. FIG. 1 is a schematic side view of a near-field optical information system according to the first embodiment.

In FIG. 1, reference numeral 1 denotes an optical disk as a medium (recording medium) formed with a phase-change material for recording or reproducing information; 2, a spindle motor holding and rotating the optical disk 1 at a predetermined speed; and 3, a near-field optical head for recording or reproducing information in or from the optical disk 1 which corresponds to the near-field optical probe slider and optical head according to the prior art.

Reference numeral 4 designates a suspension supporting the near-field optical head 3 to keep the distance between the near-field optical head 3 and the optical disk 1 constant in the directions of F (focusing) perpendicular to the optical disk 1; 5, a motor holding the suspension 4 and revolving to thereby move the near-field optical head 3 in the directions of T (tracking) flush and parallel with the optical disk 1; 6, an electric circuit controlling and driving a semiconductor laser element 31 (described later: see FIGS. 3A and 3B) as a light source, the spindle motor 2, the motor 5 or the like on the basis of a signal obtained from the near-field optical head 3; and 7, an arithmetic unit making a predetermined calculation based on information recorded in or reproduced from the optical disk 1 through the electric circuit 6.

The arithmetic unit 7 processes information on data, visuals, audio and the like. The above component elements constitute the near-field optical information system according to this embodiment; the component elements other than the arithmetic unit 7, the near-field optical information device; and the component elements further excluding the electric circuit 6, the near-field optical head device.

Figure 2:
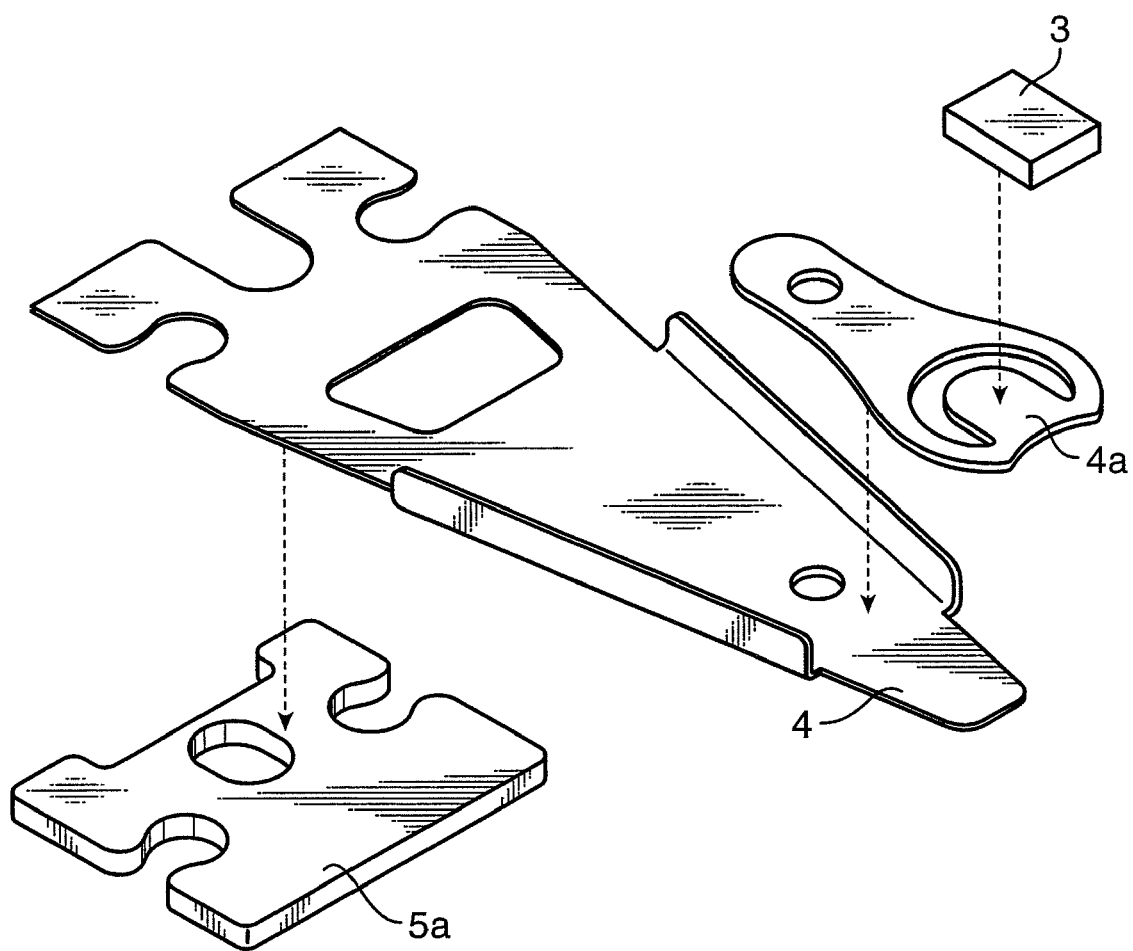
FIG. 2 is a perspective exploded view showing a configuration of a suspension shown in FIG. 1.

FIG. 2 is a perspective exploded view showing a configuration of the suspension 4 of FIG. 1. As shown in FIG. 2, the near-field optical head device includes the near-field optical head 3, a gimbal 4a, the suspension 4 and a fixing plate 5a. The suspension 4 is fixed so as to turn freely at one end to the motor 5 (see FIG. 1) via the fixing plate 5a and fixed at the other end to the near-field optical head 3 via the gimbal 4a. This configuration allows the suspension 4 to support the near-field optical head 3 with keeping the distance from the optical disk 1 constant, for example, using an art similar to a flying head employed for a hard-disk drive in a magnetic head mechanism disclosed by Japanese Unexamined Patent Publication No. 7-1616.

Figure 3A:
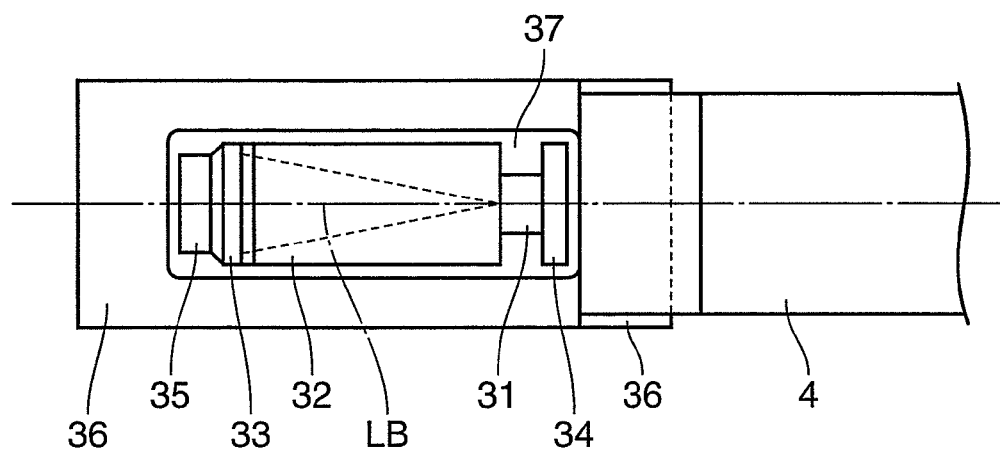
FIGS. 3A and 3B are top and side views, respectively, showing a configuration of a near-field optical head shown in FIG. 1.
Figure 3B:
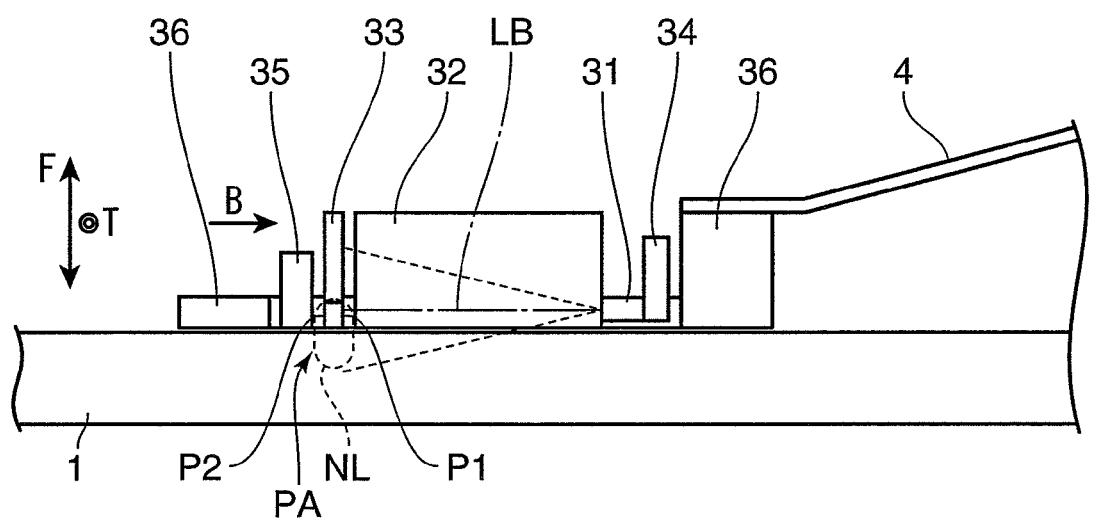

FIGS. 3A and 3B are top and side views, respectively, showing a configuration of the near-field optical head of FIG. 1. In FIGS. 3A and 3B, reference numeral 1 denotes an optical disk as a medium for recording or reproducing information; 31, a semiconductor laser element as a light source emitting, for example, in this embodiment, a radiant beam LB having a wavelength of 800 nm and a power of 50 mW and polarized in the F-directions; 32, a prism as a light guiding member transmitting the radiant beam LB of the semiconductor laser element 31; and 33, a scattering member having a substantially flat-plane shape and two first and second planes P1 and P2 substantially perpendicular to the optical disk 1. The scattering member 33 is substantially perpendicularly irradiated with the radiant beam LB passing through the prism 32 to thereby generate near field light NL in a part PA proximate to the optical disk 1 and apply it to the optical disk 1.

Reference numeral 34 designates a copper heat dissipation material fixed to the semiconductor laser element 31 and conducting and dissipating generated heat; 35, a photodetector element detecting light reproduced from the optical disk 1; and 36, a slider holding the semiconductor laser element 31, the prism 32, the scattering member 33, the heat dissipation material 34 and the photodetector element 35. These component elements constitute a so-called near-field optical probe slider as the near-field optical head 3.

Reference numeral 37 denotes a molding resin and the semiconductor laser element 31, the prism 32, the scattering member 33, the heat dissipation material 34 and the photodetector element 35 are bonded and fixed to the slider 36. The molding resin 37 is molded into a gap between the slider 36 and the semiconductor laser element 31, the prism 32, the scattering member 33, the heat dissipation material 34 and the photodetector element 35.

Figure 4:
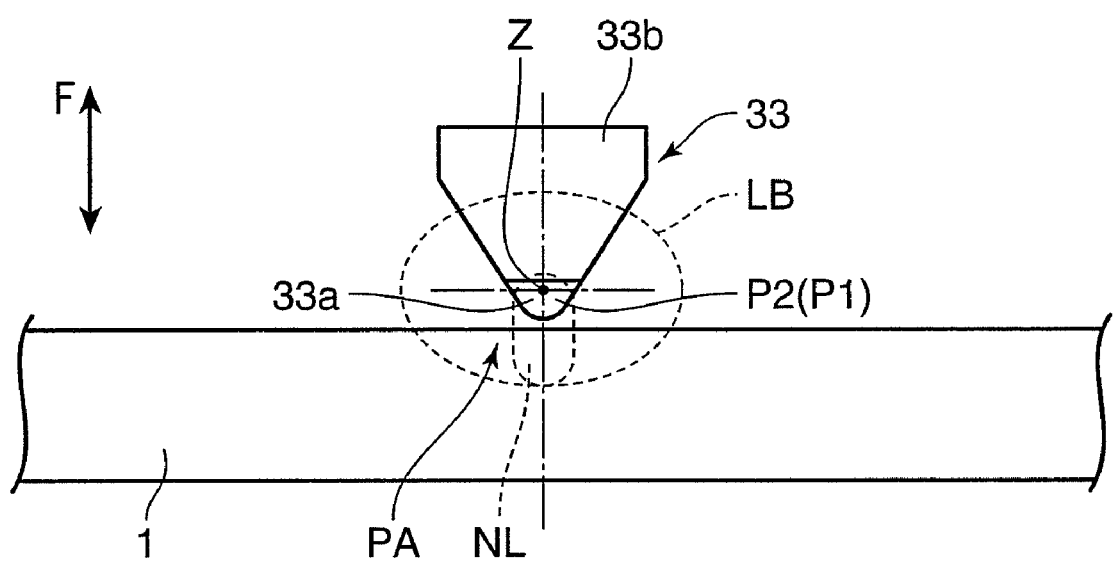
FIG. 4 is a view seen from an arrow B of FIG. 3B.

FIG. 4 is a view seen from an arrow B of FIG. 3B. The conductive scattering member 33 is formed, as shown in FIG. 4, by a scattering body 33a having a substantially flat-plane shape provided with the second plane P2 and the first plane P1 reverse to the second plane P2, and a holding member 33b having a substantially flat-plane shape. The scattering body 33a is fixed and held to the holding member 33b and fixed to the slider 36 via the holding member 33b. The scattering body 33a is made of a material generating plasmon light easily, for example, gold, titanium, chromium, silver, copper, aluminum or the like, and the optical disk 1 is made of, for example, a phase-change record material formed of an alloy of TbFeCo (terbium, iron, cobalt) or the like, or another material.

The slider 36 is supported by the suspension 4 in such a way that the distance between a tip PA of the scattering body 33a held on the slider 36 and the optical disk 1 comes within an effusion depth of the near field light NL. In this state, the scattering body 33a generates the near field light NL from the tip PA. The distance between the tip PA of the scattering body 33a and the optical disk 1 is preferably below tens of nanometers, more desirably below several nanometers, and for example, is 10 nm in this embodiment.

In this embodiment, in order to increase the effusion quantity of the near field light NL, a center Z of the radiant beam LB is brought to substantially the gravity center of the scattering body 33a generating the near field light NL in the scattering member 33. The near field light NL changes the crystal phase of the optical disk 1 provided with the phase-change material into an amorphous phase to thereby form a record mark. On the other hand, information is reproduced by allowing the photodetector element 35 to detect a variation in the intensity of reflected light returning from the optical disk 1, in further detail, because the percentage of the near field light NL scattered from the optical disk 1 varies according to the presence of the record mark, detect a variation in the intensity of the scattered light as the reflected light from the optical disk 1.

Specifically, the scattering body 33a is a substantially triangular flat plane and has the first plane P1 perpendicular to the recording surface or reproduction surface of the medium 1 on the side of the semiconductor laser element 31 and the second plane P2 parallel to the first plane P1. The slider 36 holds the scattering member 33 in such a way that the tip PA of the first plane P1 is proximate to the medium 1. In this state, the radiant beam LB from the semiconductor laser element 31 irradiates the whole first plane P1 perpendicularly through the prism 32, and the scattering member 33 has a pointed shape and applies the near field light NL to the medium 1 from the tip PA of the pointed shape.

At this time, the semiconductor laser element 31 is arranged on the bottom side of the slider 36 to thereby bring the center Z of the radiant beam LB from the semiconductor laser element 31 as exactly as possible to the gravity center of the scattering body 33a. This makes it possible to irradiate the scattering body 33a with as great optical energy as possible and thereby for the scattering body 33a to generate plasmon light sufficiently. The shape of the scattering body 33a is not limited especially to the above example, as long as it generates the near field light NL efficiently.

In this embodiment, therefore, the configuration of the recording optical system becomes simpler by applying the radiant beam LB from the semiconductor laser element 31 perpendicularly to the first plane P1 perpendicular to the medium 1, and the configuration of the reproduction optical system becomes simpler by detecting light reproduced from the optical disk 1 directly because the photodetector element 35 faces the second plane P2 opposite to the first plane P1 of the scattering body 33a irradiated with the radiant beam LB from the semiconductor laser element 31. This makes it possible to miniaturize the near-field optical head 3 sufficiently, thereby controlling the distance between the scattering body 33a and the optical disk 1 with a high precision using a similar art to a flying head employed for a hard-disk drive, and recording or reproducing information at a high density in or from the optical disk 1 by utilizing plasmon light.

For example, if the scattering body 33a is a conductive metal having a base (long side of the junction surface to the holding member 33b) of 300 nm, a height (length in the F-directions) of 400 nm and a curvature radius of 25 nm at the tip and if the semiconductor laser element 31 is a laser chip having measurements of 200 μm (width)×250 μm (depth)×90 μm (height), the head part except the slider 36 becomes approximately 2 mm×5 mm, thereby miniaturizing the slider 36 or the near-field optical head 3 up to a size of about 5 mm×5 mm.

Furthermore, in this embodiment, the semiconductor laser element 31 is the small laser chip and the heat dissipation material 34 has a surface area for sufficiently dissipating heat generated by the laser chip, thereby enabling the semiconductor laser element 31 to operate continuously and stably and keeping the distance between the scattering body 33a and the optical disk 1 precisely constant by preventing each component element from being thermally expanded and deformed unexpectedly while the semiconductor laser element 31 is in continuous operation. Alternatively, it may be appreciated that the heat dissipation material 34 is thermally connected to the suspension 4, thereby allowing the heat dissipation material 34 to dissipate heat more effectively.

In the first embodiment, therefore, the slider 36 holds the semiconductor laser element 31 and the heat dissipation material 34, the prism 32, the scattering member 33 and the photodetector element 35 to form the so-called near-field optical probe slider, thereby realizing the significantly miniaturized near-field optical head device capable of recording or reproducing information at a high density using the near field light NL for the optical disk 1. Besides, the first embodiment is provided with the heat dissipation material 34, thereby solving the heat-generation problem of the semiconductor laser element 31 as well.

The first embodiment is provided among the component elements with the heat dissipation material 34 and the photodetector element 35. However, the purport of the present invention is not vitiated even without them.

Moreover, in the first embodiment, the suspension 4 supports the slider 36 (the near-field optical head 3) and the motor 5 holds and rotates the suspension 4 to thereby make a recording or a reproduction over the whole area of the optical disk 1. However, the present invention is not limited to this configuration, as long as the slider 36 is supported to keep the distance between the scattering body 33a and the optical disk 1 below tens of nanometers as well as moves throughout the whole area of the optical disk 1.

In addition, in the first embodiment, the optical disk 1 is rotated by the spindle motor 2 to thereby record or reproduce information. Alternatively, it may be appreciated that an optical card substituted for the optical disk 1 is fixed without rotating and the slider 36 moves over the whole area of the optical card as a medium, thereby recording or reproducing information. The configuration of such an optical card device vitiates the purport of the present invention.

Furthermore, in the first embodiment, the prism 32 guides the radiant beam LB of the semiconductor laser element 31 to the scattering body 33a. However, the prism 32 may be omitted to apply the radiant beam LB of the semiconductor laser element 31 directly to the scattering body 33a.

(Second Embodiment)

Figure 5A:
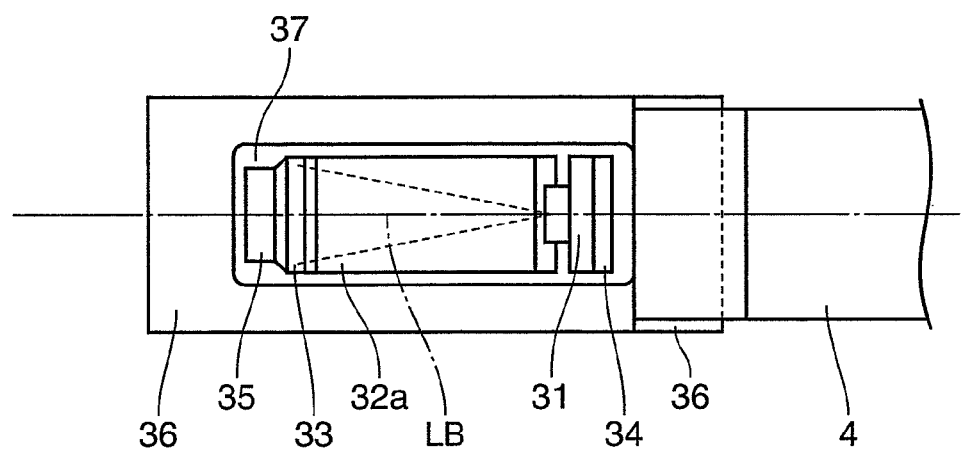
FIGS. 5A and 5B are top and side views, respectively, showing a configuration of the main part of a near-field optical head according to a second embodiment of the present invention.
Figure 5B:
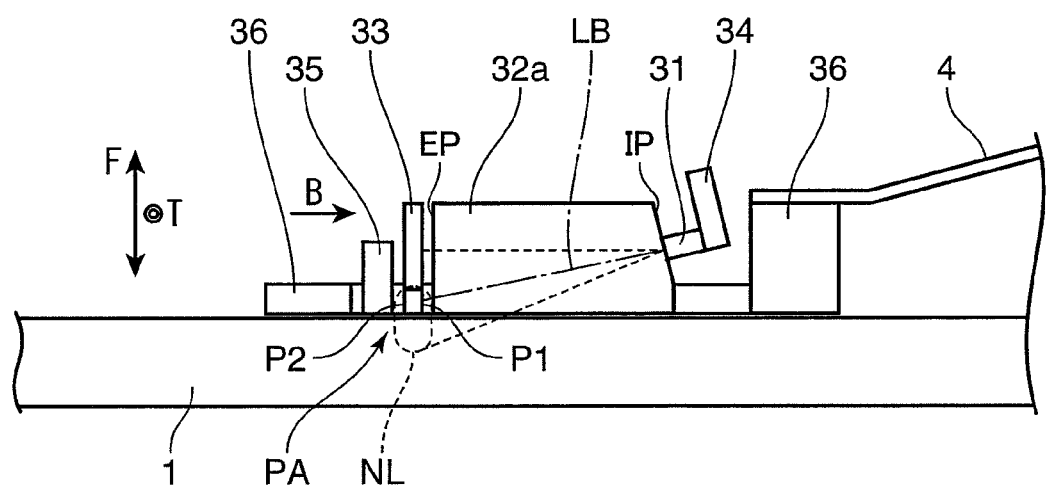

Next, a description will be given of a near-field optical information system according to a second embodiment of the present invention. This embodiment is different in a near-field optical head from the first embodiment, however otherwise the same, and thus, a configuration and an operation will be described only about the near-field optical head. FIGS. 5A and 5B are top and side views, respectively, showing a configuration of the main part of the near-field optical head according to the second embodiment.

In FIGS. 5A and 5B, all the component elements and functions and operations thereof are almost the same as the first embodiment. However, the semiconductor laser element 31 is fixed at an angle to a prism 32a, thereby applying the radiant beam LB more easily to the tip PA of the scattering body 33a.

The prism 32a has an emission plane EP parallel to the first plane P1 of the scattering body 33a and an incidence plane IP inclined with respect to the emission plane EP which fixes the semiconductor laser element 31. The prism 32a leads the radiant beam LB of the semiconductor laser element 31 obliquely downward, thereby easily irradiating the entire first plane P1 of the scattering body 33a.

Figure 6:
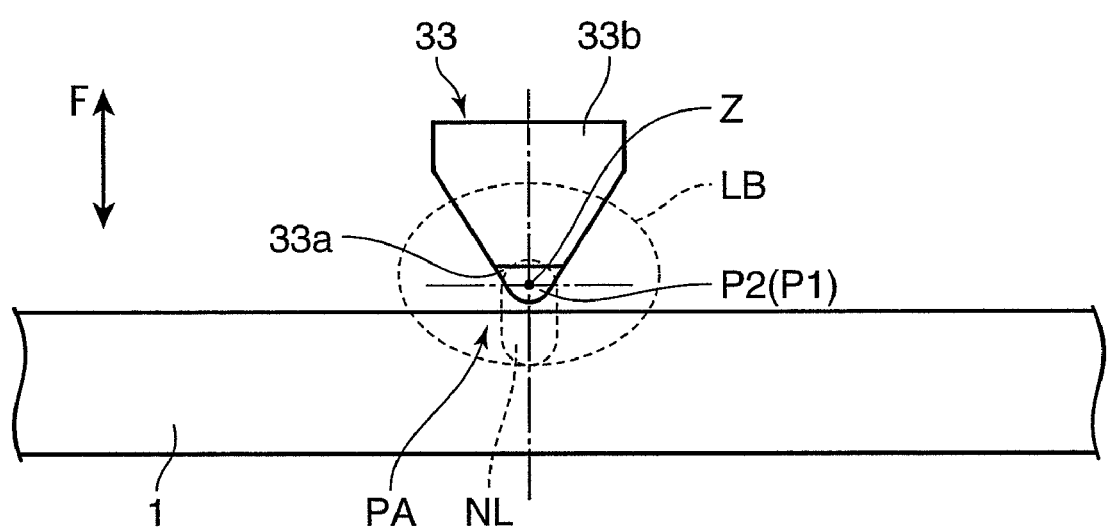
FIG. 6 is a view seen from an arrow B of FIG. 5B.

FIG. 6 is a view seen from an arrow B of FIG. 5B. In order to bring the center Z of the radiant beam LB from the semiconductor laser element 31 exactly to the gravity center of the scattering body 33a, as shown in FIG. 6, the radiant beam LB is guided obliquely downward by the prism 32a and irradiates the whole first plane P1 substantially perpendicularly, thereby irradiating the scattering body 33a with greater optical energy and thus enabling the scattering body 33a to generate plasmon light further sufficiently.

In the second embodiment, therefore, the center Z of the radiant beam LB substantially coincides more easily with the scattering body 33a generating the near field light NL in the scattering member 33, thereby further increasing the effusion quantity of the near field light NL. Besides, the heat dissipation material 34 is farther above the slider 36, thereby allowing the heat dissipation material 34 to dissipate heat more effectively.

(Third Embodiment)

Figure 7:
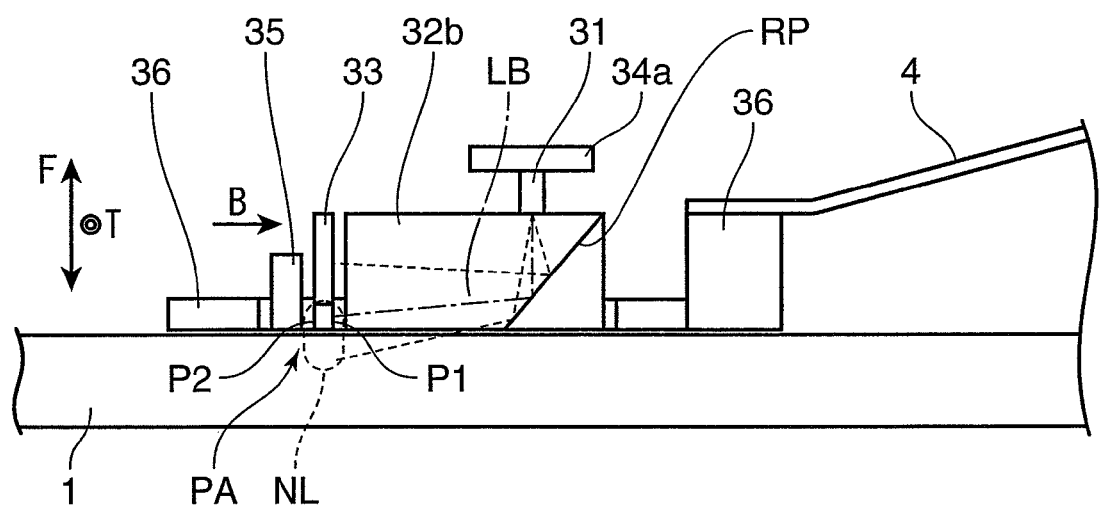
FIG. 7 is a side view showing a configuration of the main part of a near-field optical head according to a third embodiment of the present invention.

Next, a description will be given of a near-field optical information system according to a third embodiment of the present invention. This embodiment is different in a near-field optical head from the first embodiment, however otherwise the same, and thus, a configuration and an operation will be described only about the near-field optical head. FIG. 7 is a side view showing a configuration of the main part of the near-field optical head according to the third embodiment.

In FIG. 7, the basic configuration is the same as the first embodiment, and reference numeral 31 denotes a semiconductor laser element; reference numeral and character 32b, a prism transmitting the radiant beam LB of the semiconductor laser element 31; and 34a, a copper heat dissipation material. The prism 32b has an optical reflection plane RP reflecting the radiant beam LB from the semiconductor laser element 31 and leading it to the scattering member 33. In other words, the radiant beam LB from the semiconductor laser element 31 is incident from above upon the prism 32b, reflected by the optical reflection plane RP and guided obliquely downward.

The view seen from an arrow B of FIG. 7 is similar to FIG. 6. In order to bring the center Z of the radiant beam LB exactly to the gravity center of the scattering body 33a, the radiant beam LB from the semiconductor laser element 31 is guided obliquely downward by the optical reflection plane RP and irradiates the whole first plane P1 substantially perpendicularly, thereby irradiating the scattering body 33a with greater optical energy and thus enabling the scattering body 33a to generate plasmon light further sufficiently.

In the third embodiment, therefore, the optical reflection plane RP makes it easier to bring the center Z of the radiant beam LB substantially to the scattering body 33a generating the near field light NL in the scattering member 33, thereby further increasing the effusion quantity of the near field light NL. Besides, in the third embodiment, the heat dissipation material 34a is arranged above the prism 32b. This makes it possible to arbitrarily enlarge the heat dissipation material 34a compared with the first embodiment, thereby solving the heat-generation problem of the semiconductor laser element 31 more easily.

(Fourth Embodiment)

Figure 8:
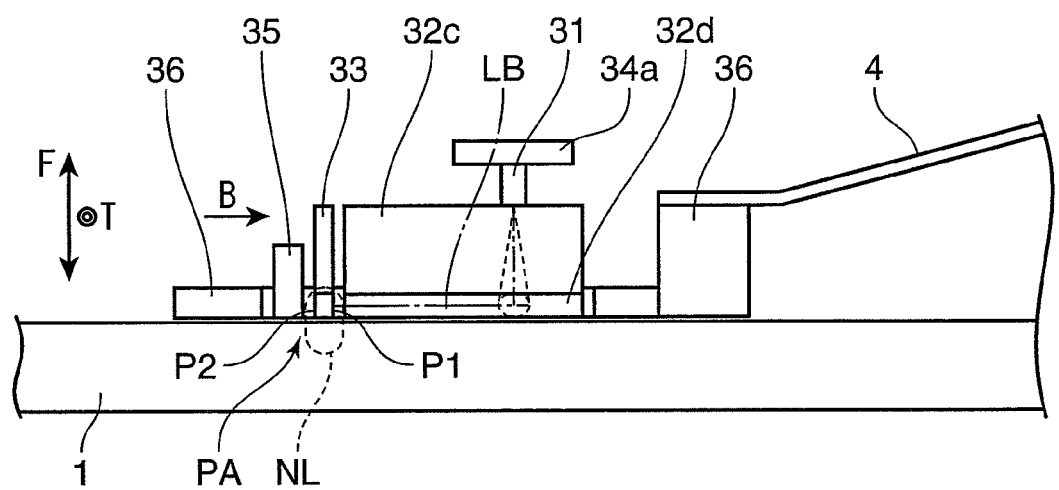
FIG. 8 is a side view showing a configuration of the main part of a near-field optical head according to a fourth embodiment of the present invention.

Next, a description will be given of a near-field optical information system according to a fourth embodiment of the present invention. This embodiment is different in a near-field optical head from the first embodiment, however otherwise the same, and thus, a configuration and an operation will be described only about the near-field optical head. FIG. 8 is a side view showing a configuration of the main part of the near-field optical head according to the fourth embodiment.

In FIG. 8, the basic configuration is the same as the first embodiment, and reference numeral 31 designates a semiconductor laser element; reference numeral and character 32c, a prism transmitting the radiant beam LB of the semiconductor laser element 31; 32d, an optical waveguide; and 34a, a copper heat dissipation material. The optical waveguide 32d united to the bottom of the prism 32 receives the radiant beam LB from the semiconductor laser element 31 and leads it inside to the scattering body 33a. In other words, the radiant beam LB from the semiconductor laser element 31 is incident from above upon the prism 32c and guided along the bottom of the prism 32 by the optical waveguide 32d.

Figure 9:
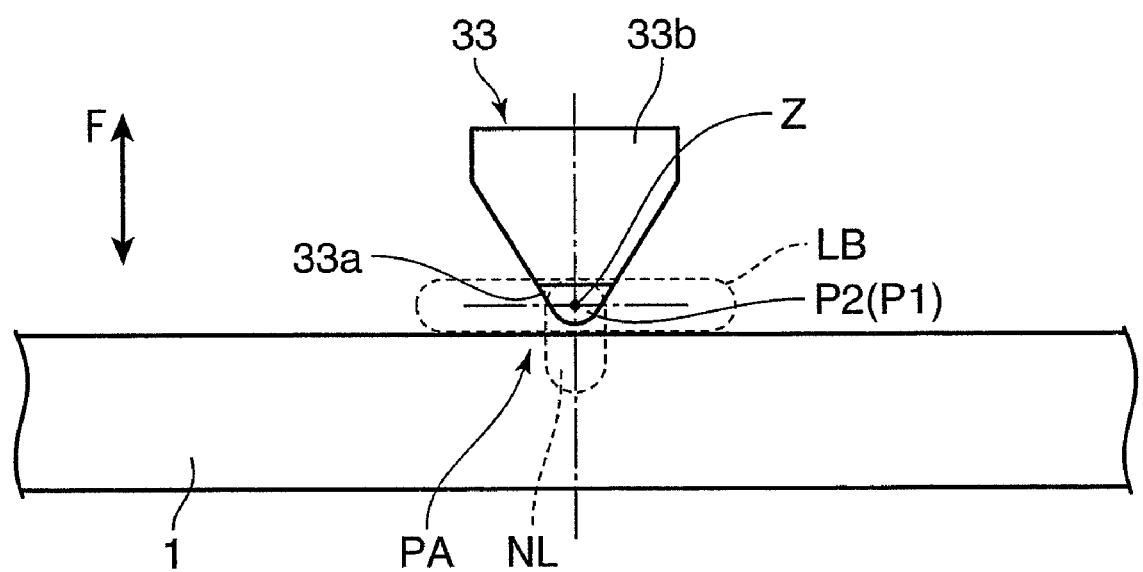
FIG. 9 is a view seen from an arrow B of FIG. 8.

FIG. 9 is a view seen from an arrow B of FIG. 8. As shown in FIG. 9, the radiant beam LB is converted into a flat beam and guided along the bottom of the prism 32 by the optical waveguide 32d and irradiates the whole first plane P1 substantially perpendicularly in such a way that the center Z coincides with the gravity center of the scattering body 33a, thereby irradiating the scattering body 33a with far greater optical energy and thus enabling the scattering body 33a to generate plasmon light still further sufficiently.

In the fourth embodiment, therefore, the optical waveguide 32d makes it easier to bring the center Z of the radiant beam LB substantially to the scattering body 33a generating the near field light NL in the scattering member 33, thereby further increasing the effusion quantity of the near field light NL. Further, in the fourth embodiment, the optical waveguide 32d converts the radiant beam LB into a flat beam and applies it to the scattering body 33a, thereby raising the irradiation power per irradiation area in an irradiation position of the scattering body 33a. Still further, in the fourth embodiment, the heat dissipation material 34a is arranged above the prism 32b. This makes it possible to arbitrarily enlarge the heat dissipation material 34a compared with the first embodiment, thereby solving the heat-generation problem of the semiconductor laser element 31 more easily.

(Fifth Embodiment)

Figure 10:
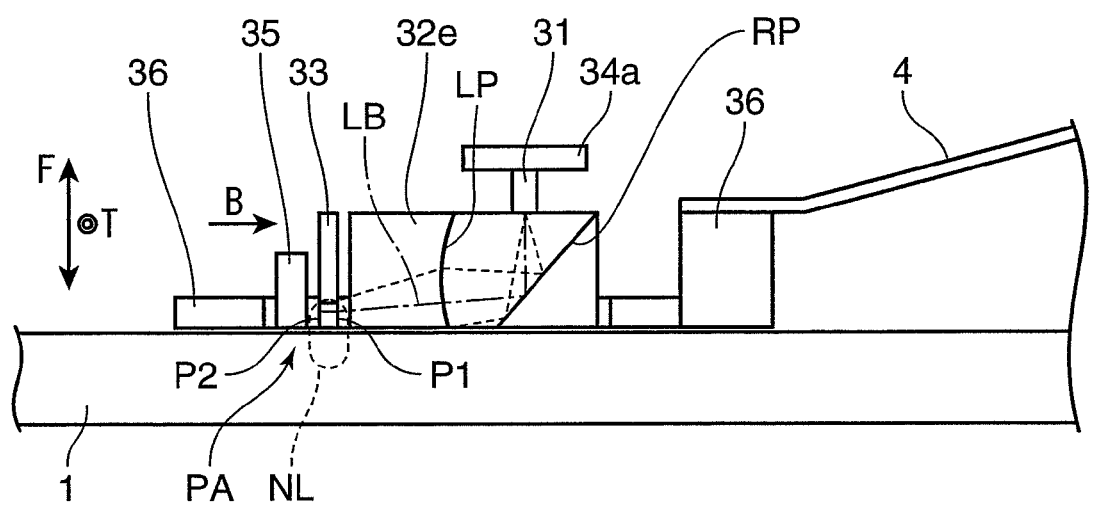
FIG. 10 is a side view showing a configuration of the main part of a near-field optical head according to a fifth embodiment of the present invention.

Next, a description will be given of a near-field optical information system according to a fifth embodiment of the present invention. This embodiment is different in a near-field optical head from the first embodiment, however otherwise the same, and thus, a configuration and an operation will be described only about the near-field optical head. FIG. 10 is a side view showing a configuration of the main part of the near-field optical head according to the fifth embodiment.

In FIG. 10, the basic configuration is the same as the first embodiment, and reference numeral 31 denotes a semiconductor laser element; reference numeral and character 32e, a prism transmitting the radiant beam LB of the semiconductor laser element 31; and 34a, a copper heat dissipation material. The prism 32e has an optical reflection plane RP and a lens surface LP. The radiant beam LB from the semiconductor laser element 31 is reflected by the optical reflection plane RP, guided toward and incident upon the lens surface LP, converged by a lens effect of the lens surface LP and led to the scattering member 33. In short, the radiant beam LB from the semiconductor laser element 31 is incident from above upon the prism 32e, reflected by the optical reflection plane RP, converged by the lens surface LP and led to the scattering member 33. The lens surface LP is formed by making the prism 32e out of two materials having a mutually-different refractive index or by providing a diffraction plane, however, the formation thereof is not limited to those.

Figure 11:
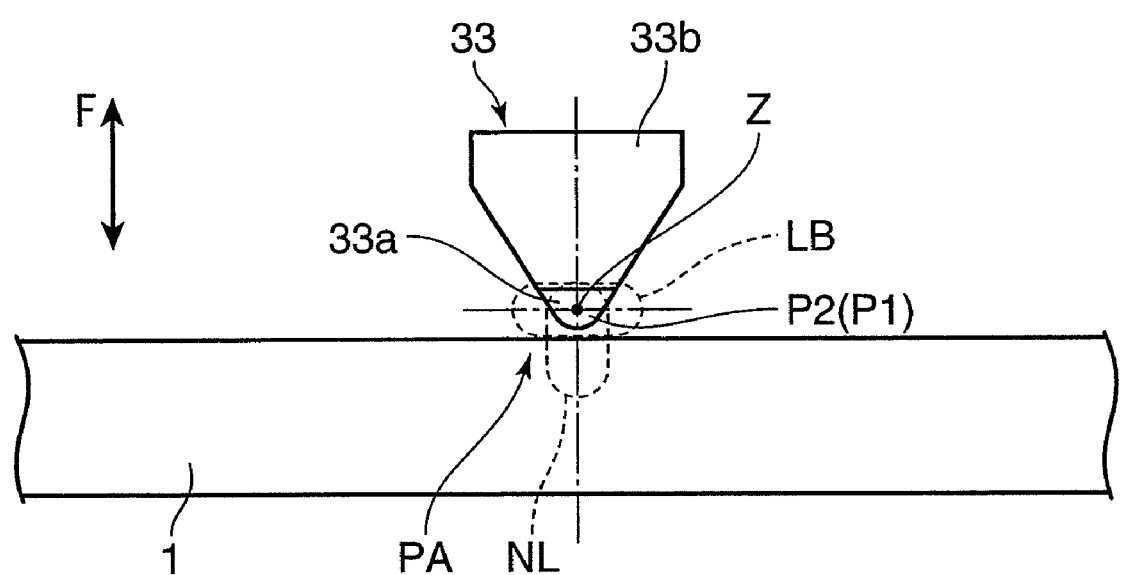
FIG. 11 is a view seen from an arrow B of FIG. 10.
Figure 13:
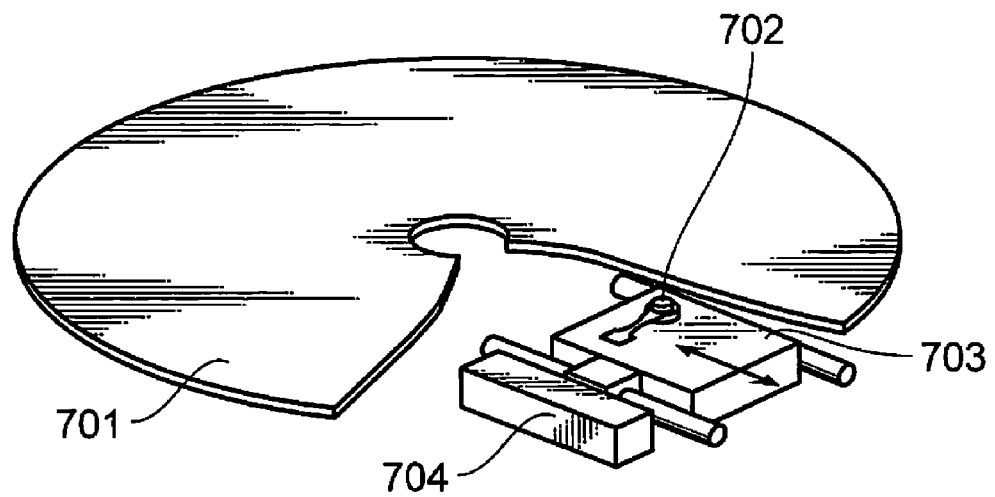
FIG. 13 is a perspective view showing a configuration of a near-field optical head device according to a prior art.
Figure 14:
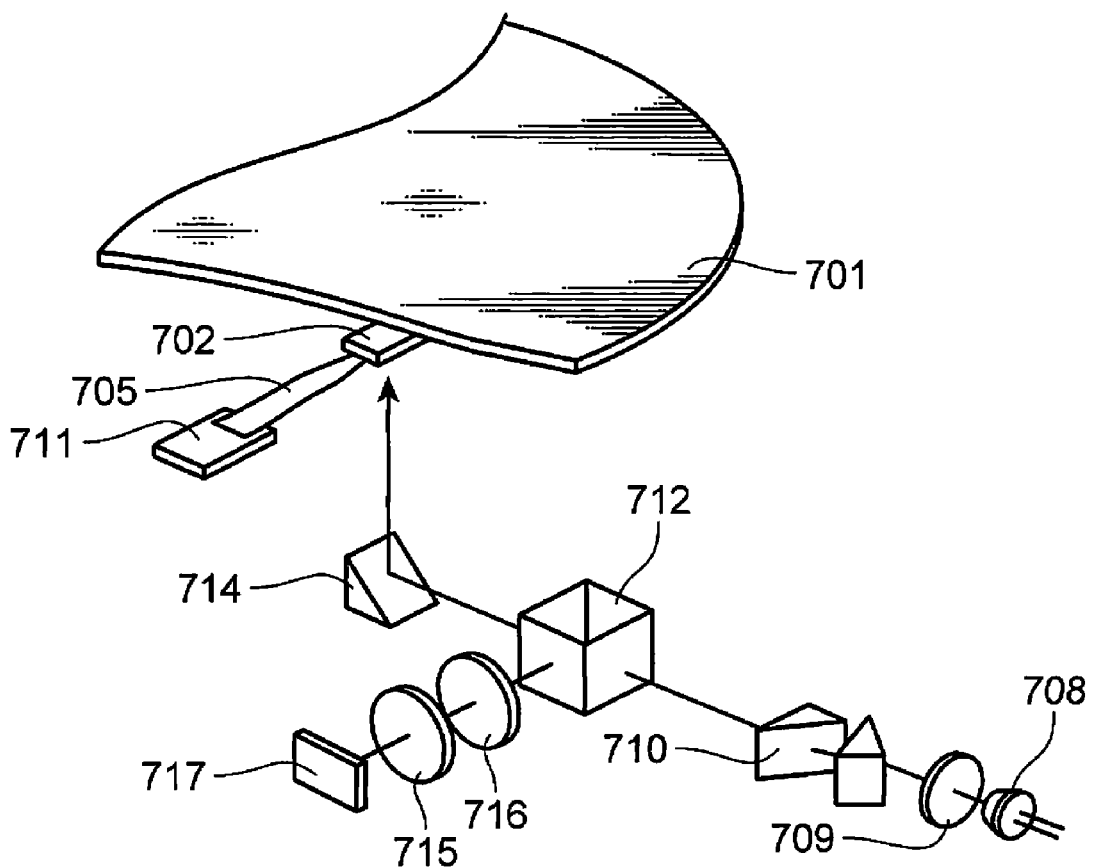
FIG. 14 is a perspective view showing a configuration of the near-field optical head device according to the prior art.

FIG. 11 is a view seen from an arrow B of FIG. 10. As shown in FIG. 11, the radiant beam LB is guided obliquely downward by the optical reflection plane RP, converged by the lens surface LP and applied substantially perpendicularly to the whole first plane P1 in such a way that the center Z coincides with the gravity center of the scattering body 33a, thereby irradiating the scattering body 33a with even greater optical energy and thus enabling the scattering body 33a to generate plasmon light still further sufficiently.

In the fifth embodiment, therefore, the optical reflection plane RP and the lens surface LP make it easier to bring the center Z of the converged radiant beam LB substantially to the scattering body 33a generating the near field light NL in the scattering member 33, thereby further increasing the effusion quantity of the near field light NL. Further, in this embodiment, the lens surface LP converges the radiant beam LB and applies it to the scattering body 33a, thereby raising the irradiation power per irradiation area in an irradiation position of the scattering body 33a. Still further, in the fifth embodiment, the heat dissipation material 34a is arranged above the prism 32b. This makes it possible to arbitrarily enlarge the heat dissipation material 34a compared with the first embodiment, thereby solving the heat-generation problem of the semiconductor laser element 31 more easily.

In each embodiment described so far, the scattering member 33 is formed by the scattering body 33a and the holding member 33b, however, the present invention is not limited especially to this example. Alternatively, it may be appreciated that the whole of a scattering member is made, without the holding member 33b, of a material generating plasmon light easily, such as gold, titanium and chromium. Besides, the shape of a scattering body is variable, for example, a scattering member 33' shown in FIGS. 12A and 12B may also be employed.

As shown in FIGS. 12A and 12B, the scattering member 33' is formed by a scattering body 33c and the holding member 33b. The scattering body 33c is fixed and held to the holding member 33b and fixed to the slider 36 via the holding member 33b. The scattering body 33c includes a first plane P1 perpendicular to the recording surface or reproduction surface of the medium 1 on the side of the semiconductor laser element 31 and a second plane P2 opposite to and inclined with respect to the first plane P1 and has a pointed shape both in front and side views.

The radiant beam LB from the semiconductor laser element 31 irradiates the whole first plane P1 substantially perpendicularly in such a way that the center Z coincides with the gravity center of the scattering body 33c, and the scattering body 33c applies the near field light NL from a sharp tip PA thereof to the medium 1. The pointed shape both in front and side views makes the near field light NL denser, thereby causing the scattering body 33c to generate plasmon light more intensely.

On the basis of each embodiment described so far, the present invention is summarized as follows. A near-field optical head according to an aspect of the present invention includes: a light source; a scattering member having a substantially flat-plane shape; and a slider holding the light source and the scattering member, in which: the slider holds the scattering member in such a way that an end of the scattering member is proximate to a medium; the scattering member has a first plane located on the side of the light source and substantially perpendicular to the medium; light emitted from the light source irradiates the first plane substantially perpendicularly; and the end of the scattering member generates near field light and applies the near field light to the medium.

The near-field optical head can apply light emitted from the light source substantially perpendicularly to the first plane of the scattering member substantially perpendicular to the medium to thereby generate near field light from the end of the scattering member and apply it to the medium. This makes it possible to simplify the configuration of a recording optical system and significantly miniaturize the near-field optical head capable of recording or reproducing information at a higher density in or from a medium.

It is preferable that: a light guiding member is further provided which transmits the light emitted from the light source and leads the light to irradiate the first plane substantially perpendicularly; and the slider holds the light source, the scattering member and the light guiding member.

In this case, the light emitted from the light source passes through the light guiding member and irradiates the first plane substantially perpendicularly. This makes it possible to irradiate the scattering member with greater optical energy and thereby for the end of the scattering member to generate plasmon light sufficiently.

It is preferable that: the scattering member may include a substantially flat-plane shaped conductive scattering body having the first plane and generating the near field light, and a holding member holding the scattering body; and the light guiding member may transmit the emitted light from the light source in such a way that the emitted light from the light source irradiates the whole first plane of the scattering body.

In this case, the light emitted from the light source can pass through the light guiding member and irradiate the whole surface of the scattering body generating the near field light, thereby generating plasmon light sufficiently and stably from the scattering body.

Preferably, the scattering body may have a pointed shape and apply the near field light to the medium from the tip of the pointed shape.

In this case, the near field light can irradiate the medium from the tip of the pointed shape of the scattering body, thereby making the near field light denser to generate plasmon light more intensely from the scattering body.

Preferably, the light guiding member may be an optical element having an optical reflection plane for reflecting the emitted light from the light source in such a way that the emitted light from the light source irradiates the whole first plane of the scattering body.

In this case, the emitted light from the light source can be easily guided down obliquely in such a way that the emitted light irradiates the whole surface of the scattering body, thereby further increasing the effusion quantity of the near field light. Besides, the heat dissipation member conducting heat generated by the light source can be arranged above the light guiding member, thereby enlarging the heat dissipation member arbitrarily to dissipate the generated heat from the light source more easily.

Preferably, the light guiding member may be an optical element having a light guiding function of guiding the emitted light from the light source in such a way that the emitted light from the light source irradiates the whole first plane of the scattering body.

In this case, the emitted light from the light source can be converted into a flat beam and guided along the bottom of the light guiding member, thereby irradiating the whole surface of the scattering body with greater optical energy to further increase the effusion quantity of the near field light. Besides, the heat dissipation member conducting heat generated by the light source can be arranged above the light guiding member, thereby enlarging the heat dissipation member arbitrarily to dissipate the generated heat from the light source more easily.

Preferably, the light guiding member may be an optical element having a function of converging the emitted light from the light source in such a way that the emitted light from the light source irradiates the whole first plane of the scattering body.

In this case, the converged emitted light can irradiate the whole surface of the scattering body with greater optical energy, thereby further increasing the effusion quantity of the near field light.

It is preferable that: a heat dissipation member is further provided which is fixed to the light source and conducts heat generated by the light source; and the slider holds the light source, the light guiding member, the scattering member and the heat dissipation member.

This makes it possible to miniaturize the near-field optical head including the heat dissipation member and dissipate heat generated from the light source sufficiently, thereby enabling the light source to operate continuously and stably and keeping the distance between the scattering member and the medium precisely constant by preventing each component element from being thermally expanded and deformed unexpectedly while the light source is in continuous operation.

It is preferable that: a photodetector is further provided which faces a second plane of the scattering member opposite to the first plane; and the slider holds the light source, the light guiding member, the scattering member and the photodetector.

In this case, the photodetector can directly detect light reproduced from the medium, thereby simplifying the reproduction optical system to make the near-field optical head smaller.

A near-field optical head device according to another aspect of the present invention includes: the near-field optical head; and a suspension structure supporting the slider to keep constant the distance between the end of the scattering member and the medium when recording information in the medium using the near field light by the scattering member.

The near-field optical head device includes the suspension structure supporting the slider to keep constant the distance between the end of the scattering member and the medium when recording information in the medium using the near field light by the scattering member. This makes it possible to miniaturize the near-field optical head device capable of stably recording or reproducing information at a higher density in or from a medium using the small near-field optical head.

Preferably, a drive mechanism may be further provided which drives the suspension structure in one direction on a plane parallel to the medium.

This makes it possible to widen the part available as a recording or reproduction surface of the medium, thereby increasing the amount of information which can be recorded or reproduced.

Preferably, the distance between the end of the scattering member and the medium may be within an effusion depth of the near field light, thereby recording or reproducing information stably using the near field light.

A near-field optical information device according to still another aspect of the present invention includes: the near-field optical head device; and an electric circuit receiving a signal obtained from the near-field optical head device and controlling and driving the light source based on the signal.

The near-field optical information device can receive a signal obtained from the near-field optical head device and control and drive the light source based on the signal, thereby miniaturizing the near-field optical information device capable of stably recording or reproducing information at a higher density in or from a medium using the small near-field optical head device.

It is preferable that: a rotation mechanism is further provided which rotates the medium; and the electric circuit receives a signal obtained from the near-field optical head and controlling and driving the rotation mechanism and the light source based on the signal.

This makes substantially the whole surface of the medium usable as a recording or reproduction surface, thereby significantly increasing the amount of information which can be recorded or reproduced.

A near-field optical information system according to still another aspect of the present invention includes: the near-field optical information device; and an arithmetic unit making a predetermined calculation based on information recorded in or reproduced from the medium by the near-field optical information device.

The near-field optical information system can make a predetermined calculation based on information recorded in or reproduced from the medium by the near-field optical information device, thereby miniaturizing the near-field optical information system capable of making diverse calculations using information more densely and stably recorded or reproduced in or from a medium.

The near-field optical head according to the present invention is configured by holding the light source and the scattering body at least on the slider, or together with those component elements, holding the light guiding member, the heat dissipation member or the photodetector thereon, and is capable of recording or reproducing information at a higher density in or from a medium using near field light with significantly miniaturized. Further, the near-field optical information device provided with the near-field optical head device including the near-field optical head is capable of recording or reproducing high-density and large-capacity information in or from a medium. Still further, the near-field optical information system provided with the arithmetic unit can be widely applied to every near-field optical information system which stores information from the arithmetic unit as information on data, visuals or audio, such as a computer, an optical disk player, an optical disk recorder, a car navigation system, an editing system, a data server and an AV component.

The invention claimed is:

1. A near-field optical head, comprising:
   a light source;
   a light guiding member;
   a scattering member having a substantially flat-plane shape and an end;
   a photodetector; and
   a slider holding said light source, said light guiding member, said scattering member and said photodetector, wherein:
   said slider holds said scattering member such that said end of said scattering member is proximate to a medium;
   said scattering member has a first plane disposed on one side of said light source and substantially perpendicular to the medium, and a second plane opposite said first plane;
   said light source is configured to emit light such that the light irradiates said first plane substantially perpendicularly;
   said scattering member includes a substantially flat-plane shaped conductive scattering body having said first plane, and configured to generate the near field light, and a holding member holding said scattering body;
   said light guiding member includes a prism,
   said prism is in the same plane as said scattering member,
   said prism has an incidence plane which fixes said light source, an emission plane substantially parallel to said first plane of said scattering body and a bottom substantially parallel to the medium and is configured to transmit the light emitted from said light source such that the light emitted from said light source irradiates the entirety of said first plane of said scattering body, and is configured to guide a radiant beam from said light source substantially along said bottom of said prism such that a center of the radiant beam from said light source is brought to a gravity center of said scattering body;
   said end of said scattering member is configured to generate near field light and is configured to apply the near field light to the medium provided with a phase-change material to change the phase of the medium to thereby form a record mark in the medium with the near field light; and
   said photodetector faces said second plane of said scattering member and is configured to directly detect light reproduced from the medium.

2. The near-field optical head according to claim 1, wherein said scattering body has a pointed shape with a tip, and is configured to apply the near field light to the medium from said tip of said pointed shape.

3. The near-field optical head according to claim 1, wherein said light guiding member has an optical reflection plane for reflecting the light emitted from said light source such that the light emitted from said light source irradiates the entirety of said first plane of said scattering body.

4. The near-field optical head according to claim 1, wherein said light guiding member has a light guiding function of guiding the light emitted from said light source such that the light emitted from said light source irradiates the entirety of said first plane of said scattering body.

5. The near-field optical head according to claim 1, wherein said light guiding member has a function of converging the light emitted from said light source such that the light emitted from said light source irradiates the entirety of said first plane of said scattering body.

6. The near-field optical head according to claim 1, further comprising:
   a heat dissipation member fixed to said light source and configured to conduct heat generated by said light source; and
   said slider holds said light source, said light guiding member, said scattering member and said heat dissipation member.

7. A near-field optical head device, comprising:
   said near-field optical head according to claim 1; and
   a suspension structure supporting said slider so as to maintain a constant distance between said end of said scattering member and the medium when recording information in the medium using the near field light by said scattering member.

8. The near-field optical head device according to claim 7, further comprising a drive mechanism configured to drive said suspension structure in one direction on a plane parallel to the medium.

9. The near-field optical head device according to claim 7, wherein the distance between said end of said scattering member and the medium is within an effusion depth of the near field light.

10. A near-field optical information device, comprising:
    said near-field optical head device according to claim 7; and
    an electric circuit configured to receive a signal obtained from said near-field optical head device and control and drive said light source based on the signal.

11. The near-field optical information device according to claim 10, further comprising:
    a rotation mechanism configured to rotate the medium; wherein
    said electric circuit is configured to receive a signal obtained from said near-field optical head and control and drive said rotation mechanism and said light source based on the signal.

12. A near-field optical information system, comprising:
    said near-field optical information device according to claim 10; and
    an arithmetic unit configured to perform a predetermined calculation based on information recorded in or reproduced from the medium by said near-field optical information device.

* * * * *